United States Patent
Van Lieshout (10) Patent No.: US 6,601,811 B1
(45) Date of Patent: Aug. 5, 2003

(54) DEVICES FOR SUPPORTING AN ELECTRICAL APPARATUS

(75) Inventor: Petrus Theodorus Wilhelmus Maria Van Lieshout, Eindhoven (NL)

(73) Assignee: Vogel's Holding B.V., Eindhoven (NL)

( * ) Notice: Subject to any disclaimer, the term of this patent is extended or adjusted under 35 U.S.C. 154(b) by 0 days.

(21) Appl. No.: 09/269,415

(22) PCT Filed: Sep. 22, 1997

(86) PCT No.: PCT/NL97/00528

§ 371 (c)(1),
(2), (4) Date: Mar. 26, 1999

(87) PCT Pub. No.: WO98/13643

PCT Pub. Date: Apr. 2, 1998

(30) Foreign Application Priority Data

Sep. 26, 1996 (NL) .............................................. 1004116

(51) Int. Cl.⁷ .............................................. E04G 3/00
(52) U.S. Cl. .............................. 248/282.1; 248/289.11; 248/425
(58) Field of Search .......................... 248/282.1, 289.1, 248/281.1, 278.1, 276.1, 283.1, 49, 68.1, 324, 326, 125.7, 425; 211/96; 108/28

(56) References Cited

U.S. PATENT DOCUMENTS

| | | | | |
|---|---|---|---|---|
| 4,562,987 A | * | 1/1986 | Leeds et al. ................ | 248/278 |
| 4,657,217 A |   | 4/1987 | Kiesel et al. | |
| 4,687,167 A | * | 8/1987 | Skalka et al. ............... | 248/282 |
| 4,708,312 A | * | 11/1987 | Rohr ...................... | 248/280.1 |
| 4,715,077 A | * | 12/1987 | Shepheard ................ | 248/49 X |
| 4,836,486 A | * | 6/1989 | Vossoughi et al. ....... | 248/281.1 |
| 4,863,124 A | * | 9/1989 | Ball et al. ..................... | 108/28 |
| 4,953,821 A |   | 9/1990 | Reuter et al. | |
| 5,271,590 A | * | 12/1993 | Rosen ...................... | 248/222.1 |
| 5,379,205 A | * | 1/1995 | Peng ...................... | 362/430 |
| 5,429,336 A | * | 7/1995 | Ko .............................. | 248/278 |
| 5,490,652 A | * | 2/1996 | Martin .................... | 248/282.1 |
| 5,518,083 A | * | 5/1996 | Blennert ..................... | 182/188 |
| 5,799,917 A | * | 9/1998 | Li ........................... | 248/284.1 |
| 6,000,560 A | * | 12/1999 | Barkan ........................ | 211/96 |
| 6,059,417 A | * | 5/2000 | Tatoian ....................... | 359/856 |
| 6,095,468 A | * | 8/2000 | Chirico et al. ........... | 248/282.1 |

FOREIGN PATENT DOCUMENTS

| | | |
|---|---|---|
| DE | 42 44237 C1 | 3/1994 |
| EP | 0 384109 A2 | 8/1990 |
| EP | 0 445331 A1 | 9/1991 |
| GB | 2 083 878 A | 3/1982 |

* cited by examiner

Primary Examiner—Leslie A. Braun
Assistant Examiner—Tan Le
(74) Attorney, Agent, or Firm—Ladas & Parry (57) ABSTRACT

A device for supporting an electrical apparatus, such as a TV set, for example, which device comprises a supporting arm (4), which is connected to a wall or a ceiling with a first end in such a manner as to be capable of pivoting movement about pivot axis, and which is provided with a supporting platform (5) for said electrical apparatus at a second end remote from said first end. The device furthermore comprises a cover, which can be detachably attached to the supporting arm, whereby a cable pass-through space extends between said supporting arm and said cover. The device is furthermore provided with at least two covers (11, 12), which each comprise a flange (13, 14), which flanges (13, 14) engage round the pivot axis from different sides of said pivot axis, whereby a cable pass-through space extends between said flanges and said pivot axis.

32 Claims, 12 Drawing Sheets

DEVICES FOR SUPPORTING AN ELECTRICAL APPARATUS

The invention relates to a device for supporting an electrical apparatus, such as a TV set, for example, which device comprises a supporting arm, which is connected to a wall or a ceiling with a first end, and which is provided with a supporting platform for said electrical apparatus at a second end remote from said first end, whereby near at least one end the supporting arm is capable of pivoting movement about at least one pivot axis, said device furthermore comprising a cover, which can be detachably attached to the supporting arm, whereby a cable pass-through space extends between said supporting arm and said cover.

With a similar device known from U.S. Pat. No. 4,953, 821 the first end is fixed to a wall or a ceiling, and an electrical apparatus is mounted on the supporting platform. The electrical apparatus is to be connected to the mains by means of an electric cable.

If the electrical apparatus is a TV set, it must furthermore be connected to a community antenna system by means of an antenna cable. In addition to that a TV set is often connected to a video recorder by means of a video cable. With the device known per se these cables are led from the supporting platform, along the supporting arm, to the wall, from where the cables are led along the wall to the respective terminal connecting points. At the location of the pivot axis the cables are hidden from view by means of a bellows.

The cables are provided with plugs at their ends, which plugs may be relatively large, as is for example the case with a so-called SCART cable. As a result of this it is only possible to pass a cable and a plug attached thereto through the bellows when the bellows comprises a relatively large cross-section, which has an adverse effect on the appearance of the device. Alternatively the cable is passed through the bellows first, and only then is the bellows slid over the supporting arm. When the cable is to be replaced, the bellows must be removed first, which is relatively laborious. In view of the complexity of the so-called SCART connection it is also undesirable to remove the SCART connection and subsequently reconnect it again in order to replace the cable.

The object of the invention is to provide a device wherein the cable is hidden from view in a simple manner in the pivot axis area.

This objective is accomplished with the device according to the invention in that said device is provided with at least two opposed covers, each comprising a flange engaging round the pivot axis from different sides of said pivot axis, whereby a cable pass-through space extends between said flanges and said pivot axis.

The cable present within the covers positioned on either side of the pivot axis is hidden from view by said covers. The covers are placed on the supporting arm after the cable has been provided, they can be readily removed, if necessary, after which the cable can be replaced. This makes it possible to keep the total cross-sectional area of the covers relatively small.

The invention also relates to a device for supporting an electrical apparatus, such as a TV set, for example, which device comprises a supporting arm, which is connected to a wall or a ceiling with a first end in such a manner as to be capable of pivoting movement about a pivot axis, and which is provided with a supporting platform for said electrical apparatus at a second end remote from said first end, which supporting arm comprises at least two arm portions which are capable of swivelling movement about a swivel axis with respect to each other, said device furthermore comprising a cover, which can be detachably attached to said supporting arm, whereby a cable pass-through space extends between said supporting arm and said cover, said arm portions are positioned one above the other near said swivel axis.

By such a device which is known from the European patent application EP-A2-0,384,109 a bellow is mounted on top of the swivel axis, which bellow is used to guide the cables. Because the bellow lies on top of the arm portions, the device is relatively bulky.

Another object of the invention is to provide a cover wherein a cable is hidden from view in a simple manner in the swivel axis area when the device comprises arm portions capable of swivelling movement about a swivel axis with respect to each other, whilst the replacement of the cable is also a relatively simple operation.

This objective is accomplished with the device according to the invention in that the cover is provided with a cup-shaped part, which engages round an end of an arm portion comprising part of said swivel axis, and whereby a cable pass-through space in the shape of a segment of a cylinder extends between said arm portion and said cup-shaped part.

The end of said arm portion as well as the cable extending along said arm portion are hidden from view by said cup-shaped part.

The invention will be explained in more detail hereafter with reference to drawings, wherein.

Like parts are numbered alike in the Figures.

Figure 1A:
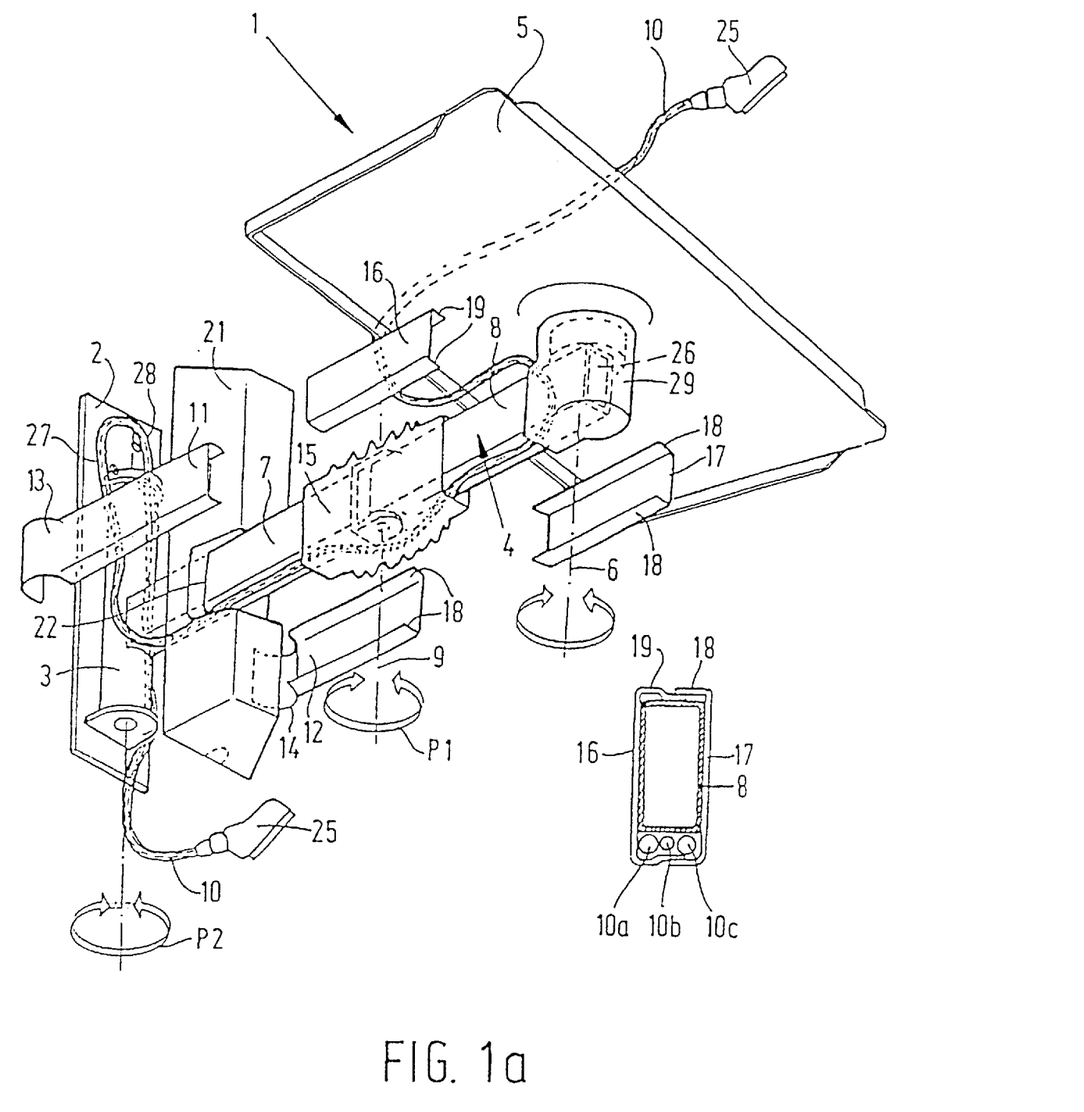
FIGS. 1a and 1b are perspective views of a first embodiment of the device according to the invention, showing the device in exploded view and in assembled condition respectively.
Figure 1B:
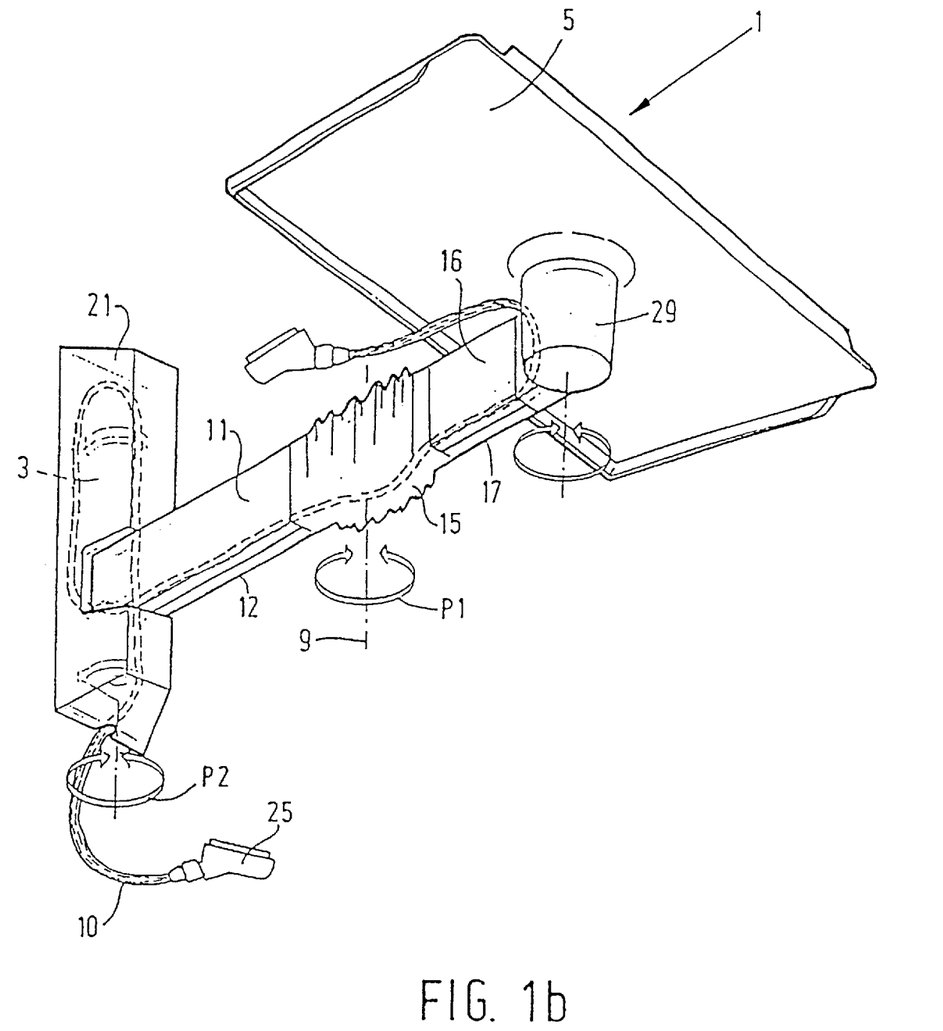

FIGS. 1a and 1b show a first embodiment of a device 1 according to the invention, which comprises a plate 2 fixed to a wall, to which a supporting arm 4 capable of pivoting movement about a vertically extending pivot axis 3 is attached. Supporting arm 4 is connected to an underside of a supporting platform 5 on a side remote from plate 2. Supporting platform 5 is connected to supporting arm 4 in such a manner as to be capable of pivoting movement about a pivot axis 6, which likewise extends in vertical direction. Supporting arm 4 comprises two arm portions 7, 8, which are swivelled together and which are capable of swivelling movement about a vertically extending swivel axis 9 with respect to each other, in directions indicated by double arrow P1. An electrical apparatus is placed on supporting platform 5, which apparatus is connected, by means of a cable 10, to a terminal connecting point located elsewhere. Said terminal connecting point may for example be an electric plug point, an antenna connection or another electrical apparatus. The device described so far corresponds with devices which are known per se.

In order to hide cable 10 from view, device 1 according to the invention is provided with a number of covers, which each cover part of cable 10. Near pivot axis 3 arm portion 7 is provided with two opposed U-shaped covers 11, 12, which engage one another. Covers 11, 12 are provided at their ends located near pivot axis 3 with flanges 13, 14 in the shape of a segment of a cylinder. Covers 11, 12 join a bellows-shaped cover 15 on a side remote from flanges 13, 14. Bellows-shaped cover 15 extends from first arm portion 7, over swivel axis 9, to a position on second arm portion 8. Second arm portion 8 is likewise provided with two opposed U-shaped covers 16, 17, which engage one another. Like covers 11, 12, U-shaped covers 16, 17 are each provided with two upright edges 18, 19, whereby opposed edges 18, 19 engage one another. Covers 11, 12, 15, 16, 18 are dimensioned such that a cable pass-through space 20 extends between arm portions 7, 8 and covers 11, 12, 16, 17 and bellows-shaped cover 15. Cable 10 is present within said cable pass-through space 20. The cross-sectional view of arm portion 8 in the right-hand bottom part of FIG. 1 shows three cables 10a, 10b, 10c present within cable pass-through space 20, which cables are connected to different terminal connecting points. Device 1 is provided with a cover 21 near plate 2, which cover extends over the entire height of plate 2. Cover 21 is provided with a recess 22, into which arm portion 7 and the cover 11, 12 provided round said arm portion extend.

Figure 3:
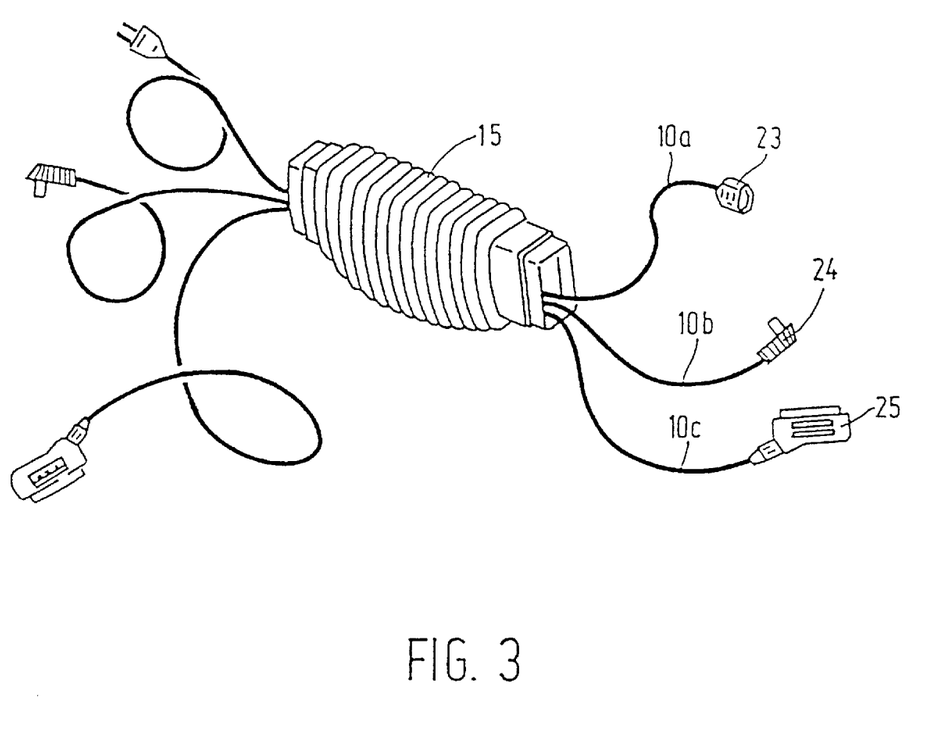
FIG. 3 shows a bellows-shaped cover of the devices shown in FIGS. 1 and 2.

The assembly of device 1 and the fixing of cable 10 will now be explained in more detail with reference to FIGS. 1 and 3.

Cables 10a, 10b, 10c and their respective plugs 23, 24, 25, which have been disconnected from an electrical apparatus and from terminal connecting points, are passed through bellows-shaped cover 15. Plate 2 is fixed to a wall together with the pivot axis 3 and the supporting arm 4 connected therewith. Then plugs 23, 24, 25 (electricity, community antenna, SCART) are passed through recess 22 of cover 21, after which cover. 21 and bellows-shaped cover 15 are successively slid over supporting arm 4 towards plate 2. Then supporting platform 5 is attached to end 26 of supporting arm 4. The electrical apparatus may now be placed on supporting platform 5, and plugs 23, 24, 25 may be connected to the apparatus. At plate 2 a portion 27 of cable 10 (or cables 10a, 10b, 10c) is first bent in an upward direction, parallel to pivot axis 3, after which cable 10 is bent in an opposite direction (portion 28). The loop thus formed in the cable makes it possible to pivot supporting arm 4 about pivot axis 3 in directions indicated by arrow P2 without cable 10 being squeezed. After providing cable 10 in this manner, cover 21 and bellows-shaped cover 15 are moved towards the end 26 until cover 13 can be provided round pivot axis 3 and first arm portion 7. After cover 21 and bellows-shaped cover 15 have been slid back to the desired location again, covers 16 and 17 are provided round second arm portion 8. Near end 26 supporting arm 4 is provided with a cover 29, which also surrounds pivot axis 6. The various covers hide cable 10 from view over the entire length of supporting arm 4.

Only those parts of the embodiments of devices according to the invention shown in FIGS. 2–9 that differ from the devices described above will be discussed hereafter.

Figure 2:
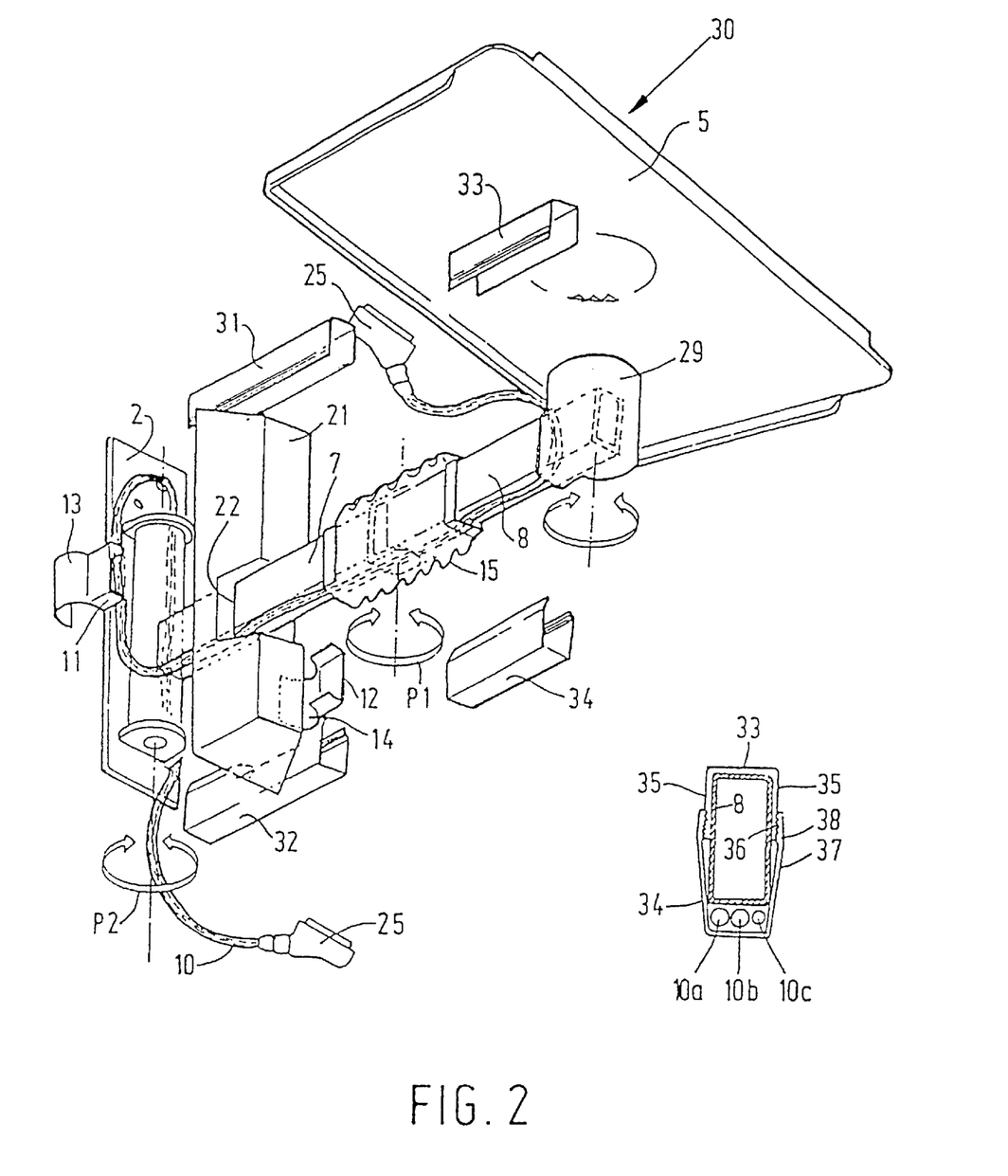
FIG. 2 shows a perspective view of a second embodiment of a device according to the invention.

FIG. 2 shows a second embodiment of a device 30 according to the invention, which is provided with covers 31, 32, 33, 34 engaging round arm portions 7, 8, whereby covers 31, 33 positioned on an upper side and covers 32, 34 positioned on a lower side have identical cross-sections. Covers 31, 33 are U-shaped, they are provided with external teeth 36 at the ends of legs 35 of said U-shape. U-shaped covers 32, 34 are provided with internal teeth 38 at the ends of legs 37 of said U-shape, which teeth 38 engage teeth 36 of covers 31, 33 when covers 31, 32 and 33, 34 are brought together. Depending on the required space for passing the cable through, the opposed covers 31, 32 and 33, 34 can be moved further apart or less far apart.

Figure 4A:
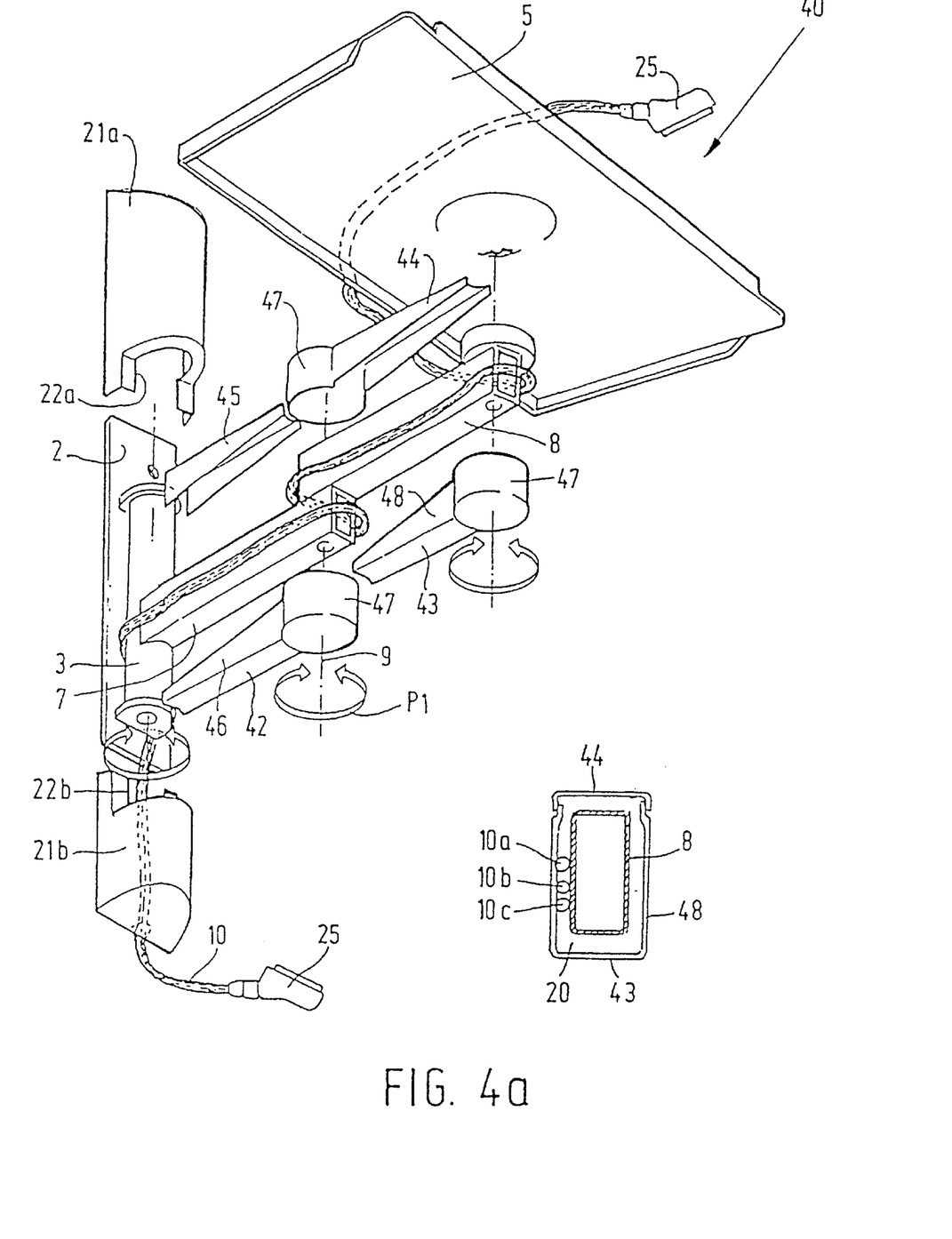
FIGS. 4a and 4b are perspective views of a third embodiment of the device according to the invention, showing the device in exploded view and in assembled condition respectively.
Figure 4B:
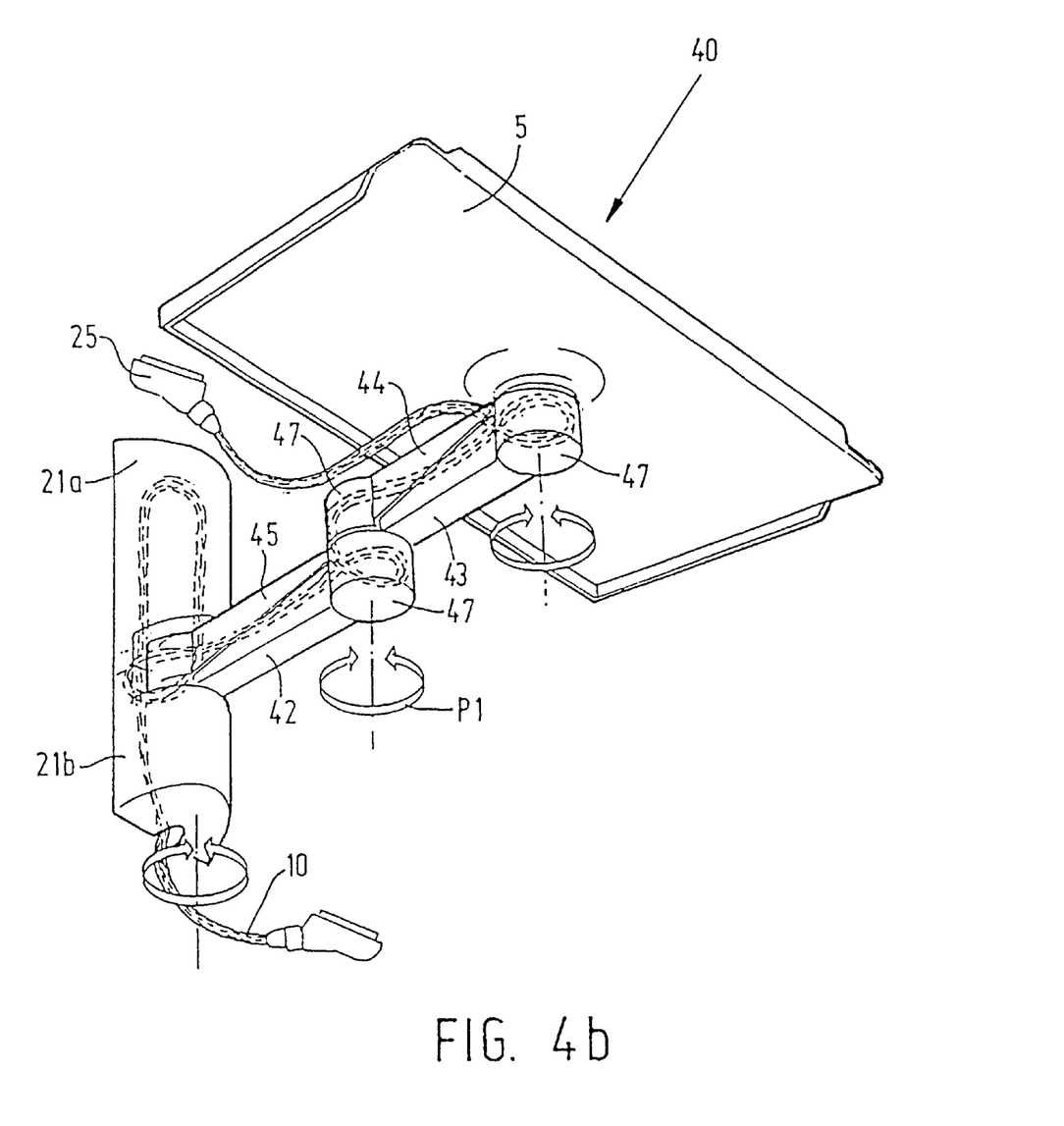

FIGS. 4a and 4b show a third embodiment of a device 40 according to the invention, which comprises a plate 2, which is fixed to a wall, and an arm portion 7, which is pivotly connected thereto. Device 40 furthermore comprises an arm portion 8, which is swivelled to arm portion 7 about a swivel axis 9. Arm portion 8 is positioned above arm portion 7. Arm portion 8 is pivotally connected to supporting platform 5 with an end 26 remote from swivel axis 9. Device 40 is provided near plate 2 with two parts 21, 21b which can be coupled together, thus forming a cover 21. Each part 21a, 21b comprises a part 22a, 22b of a recess 22 to be formed in cover 21. Covers 42, 43, 44, 45 engage round arm portions 7, 8, whereby covers 42, 43, 44 are identically shaped. Said covers 42, 43, 44 comprise a trough-shaped portion 46, which joins a cylindrical cup-shaped portion 47 with one end. The height of walls 48 of trough-shaped portion 46 gradually decreases from cup-shaped portion 47 towards the end remote from said cup-shaped portion 47. Cup-shaped portion 47 is dimensioned to engage round one end of the respective arm portion 7, 8, leaving open a cable pass-through space in the shape of a segment of a cylinder. Cable 10 is passed over the nearby end of arm portion 7, 8 near each cup-shaped portion 47, as a result of which cable 10 will not be squeezed when arm portions 7, 8 or supporting platform 5 pivot about swivel axis 9 or pivot axis 6. Cover 45 is identical to trough-shaped portion 46 of cover 42 as regards shape and dimensions.

Figure 5:
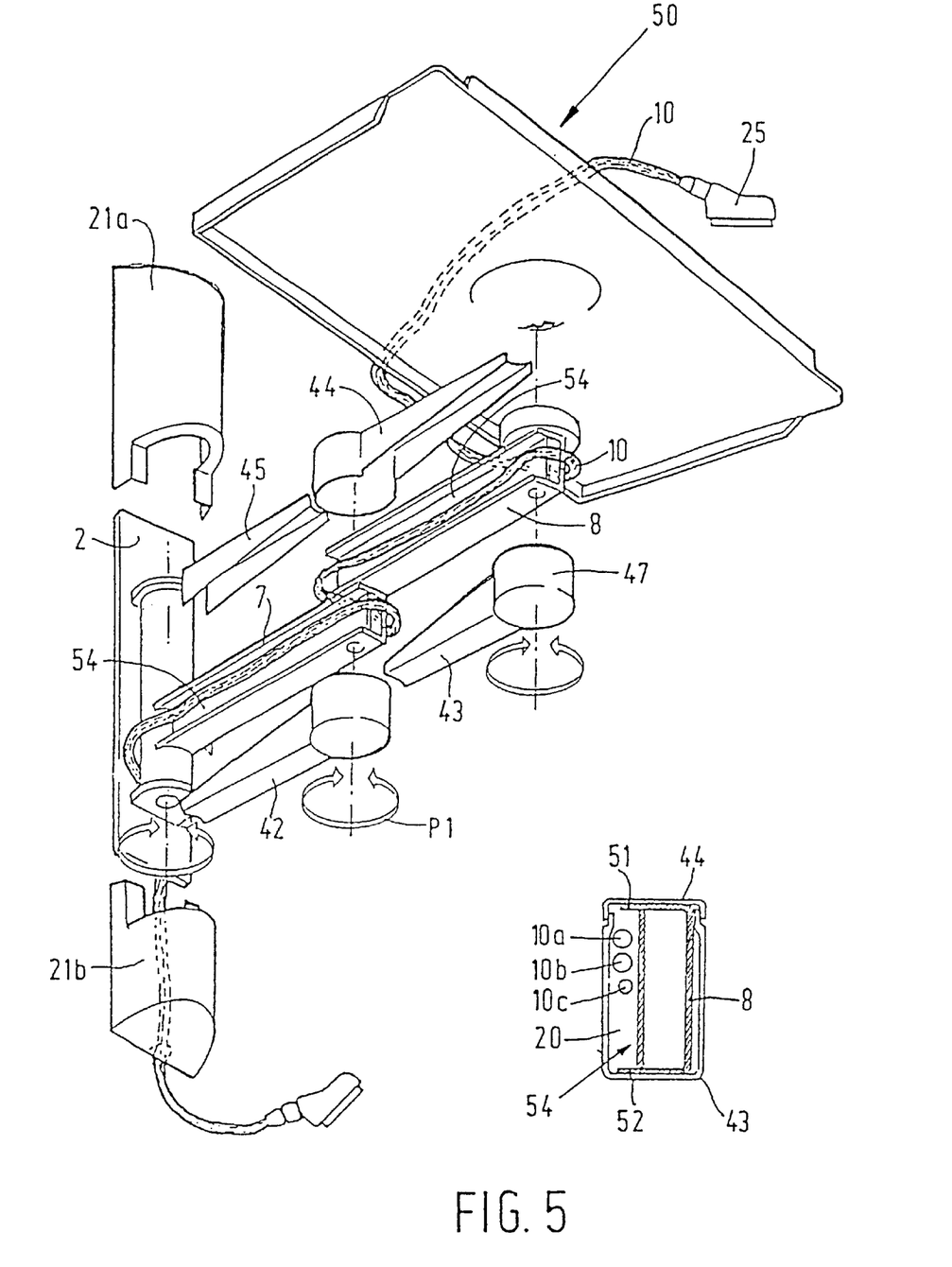
FIG. 5 shows a fourth embodiment of the device according to the invention.

FIG. 5 shows a fourth embodiment 50 of a device according to the invention. Device 50 is different from the device 40 shown in FIG. 4 in that different sections are used for arm portions 7, 8. With the device 40 illustrated in FIG. 4 said sections of arm portions 7, 8 are rectangular. With the device 50 illustrated in FIG. 5 said sections of arm portions 7, 8 are likewise rectangular, but they are provided with an extended upper wall 51 and lower wall 52 respectively near their upper and lower sides, thus forming a U-shaped section 54 together with a side wall 53. Cables 10a, 10b, 10c are laid in said U-shaped section 54.

Figure 6:
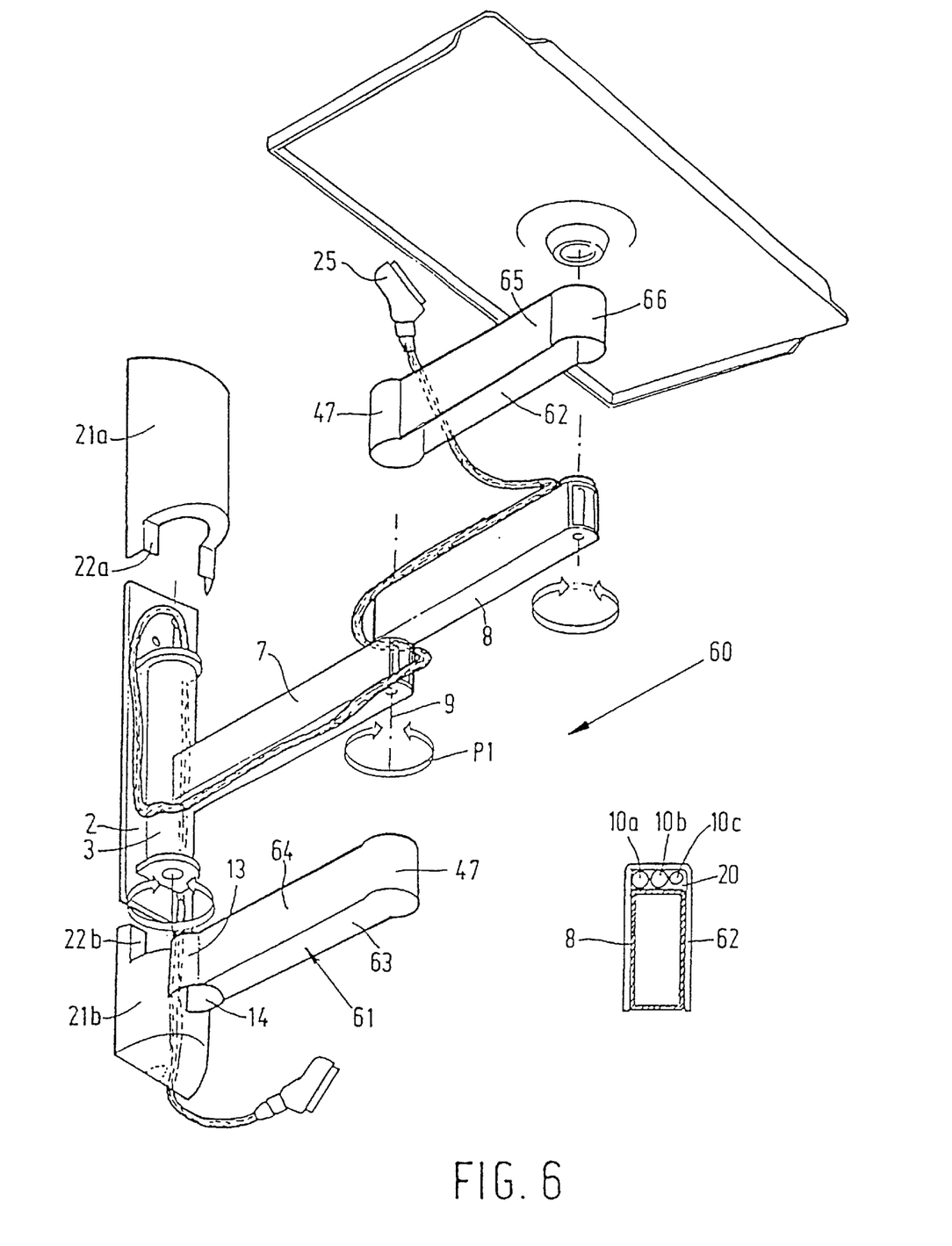
FIG. 6 shows a fifth embodiment of the device according to the invention.

FIG. 6 shows a fifth embodiment 60 according to the invention, which is provided with two covers 61, 62, which engage round arm portions 7 and 8 respectively. Cover 61 comprises a plate portion 63 extending parallel to the underside of arm portion 7 and two plate portions 64 extending parallel to the side walls of arm portion 7. Cover 61 is provided with a cup-shaped portion 47 near one end, which engages round the end of arm portion 7 that swivels about swivel axis 9. Cover 61 is provided with flanges 13, 14 in the shape of a segment of a cylinder at an end remote from cup-shaped portion 47, which flanges engage round pivot axis 3. Cover 62 likewise comprises a U-shaped portion 65 made up of plate portions 63 and 64. Said U-shaped portion 65 is provided with a cup-shaped portion 47 near one end. Cover 62 is provided with a sleeve-shaped portion 66 at an end remote from cup-shaped portion 47.

Sleeve-shaped portion 66 is open both at its upper side and at its bottom side. After cable 10 has been provided along arm portions 7, 8 and plate 2 in the manner shown in FIG. 6, covers 61 and 62 are slid over arm portions 7 and 8 respectively. The upper side of arm portion 7 and the underside of arm portion 8 remain exposed to view thereby. Cables 10a, 10b, 10c are hidden from view, however.

Figure 7:
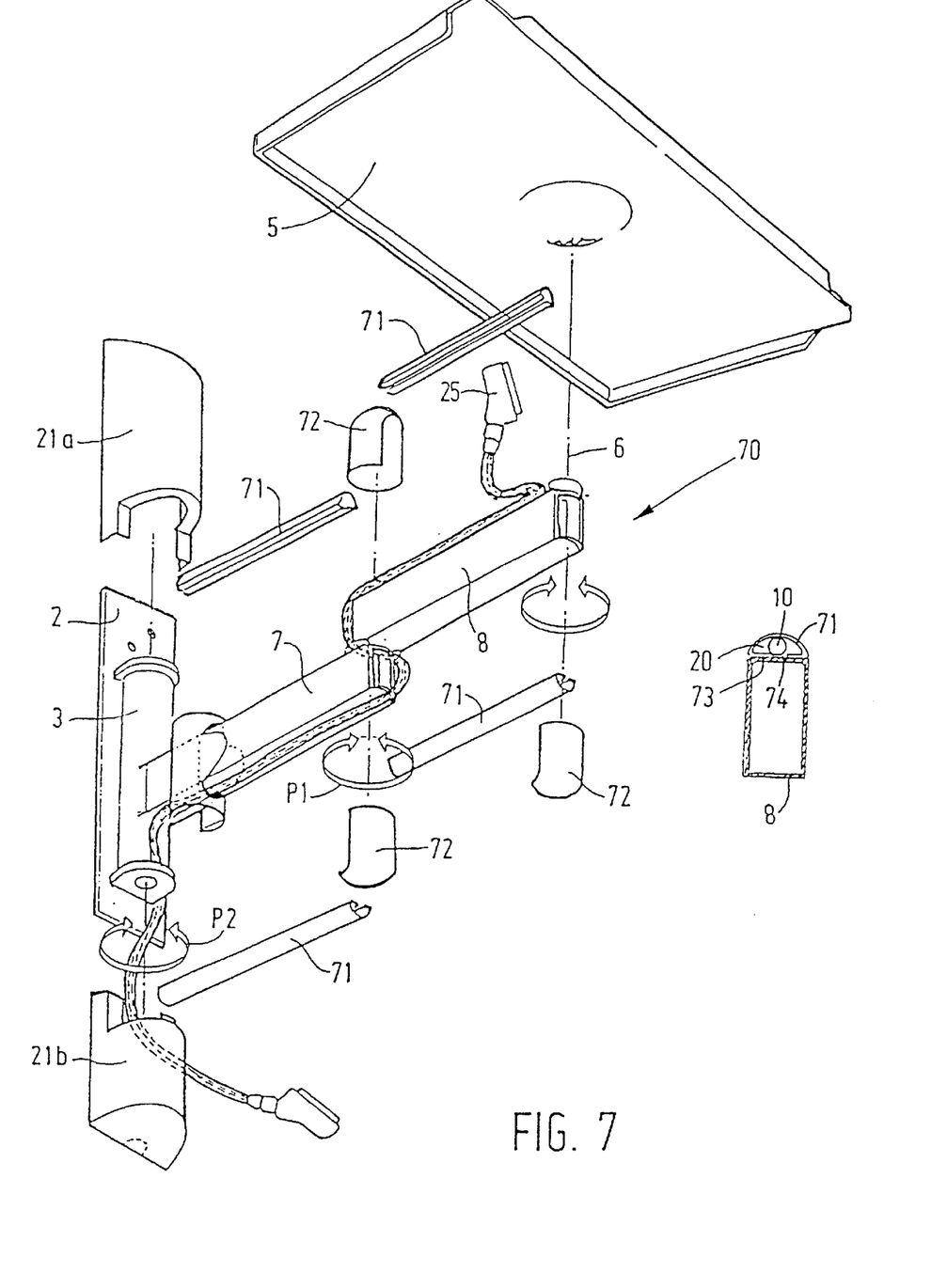
FIG. 7 shows a sixth embodiment of the device according to the invention.

With the embodiment of a device 70 according to the invention illustrated in FIG. 7 the covers are made up of ducts 71, which can be affixed to arm portions 7, 8, and of cup-shaped covers 72, which engage round ends of arm portions 7, 8. Ducts 71 are D-shaped, with a recess 74 being provided over the entire flat side 73 of D-shaped duct 71, via which cable 10 can be placed in D-shaped duct 71. Duct 71 may for example be affixed by means of double-sided adhesive tape.

Figure 8:
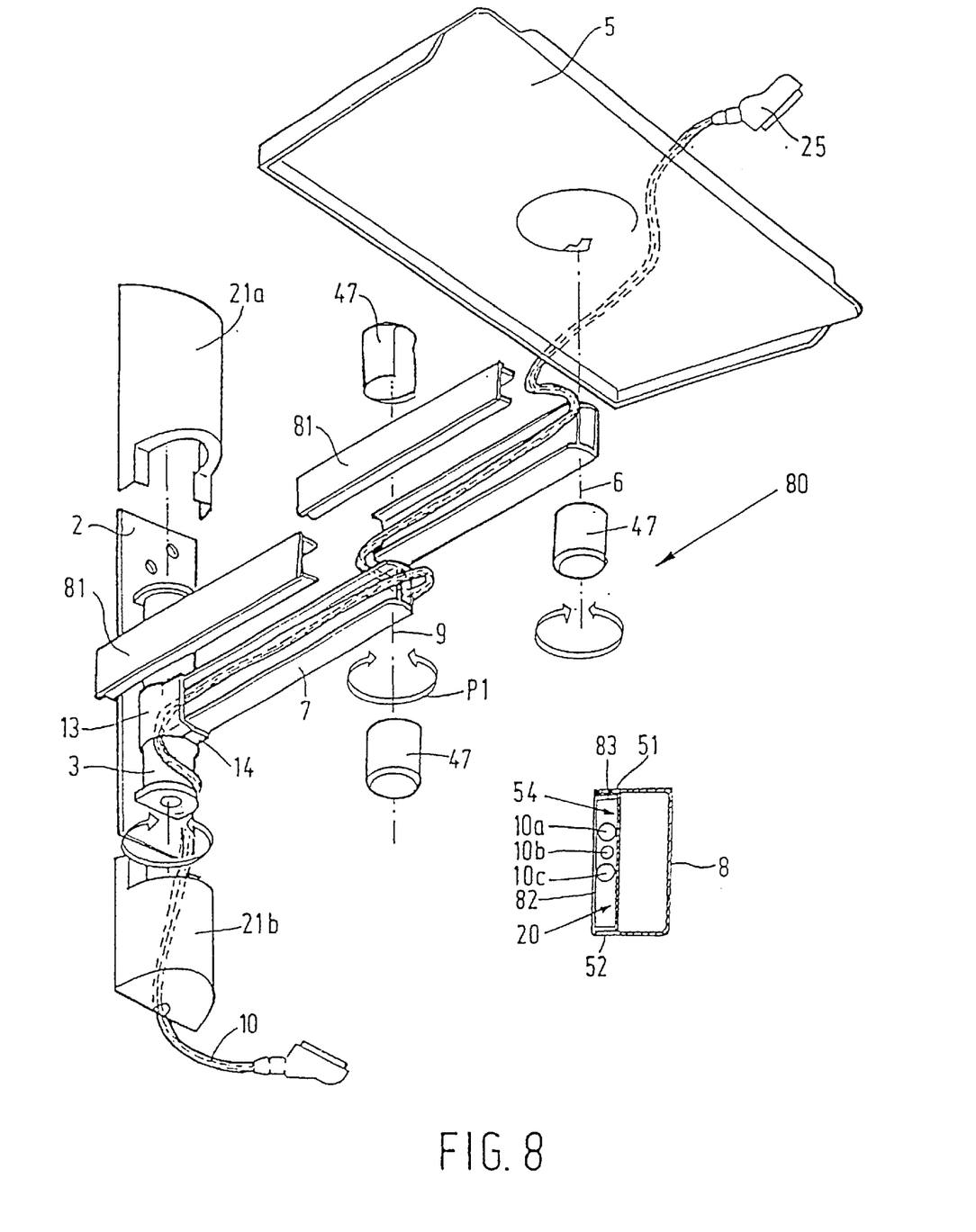
FIG. 8 shows a seventh embodiment of the device according to the invention.

With the embodiment of a device 80 according to the invention illustrated in FIG. 8 arm portions 7, 8 comprise U-shaped sections 54, which accommodate cables 10a, 10b, 10c. U-shaped sections 54 are closed by means of covers 81. Covers 81 are to this end provided with plate-shaped parts 82 extending parallel to the longitudinal sides of arm portions 7, 8 and with flanges 83 extending transversely to plate-shaped parts 82, which are in engagement against spring force with facing sides of walls 51, 52 of U-shaped section 54. The ends of arm portions 7, 8 are hidden from view near swivel axis 9 and pivot axis 6 by means of cup-shaped covers 47. Because covers 47 are cylindrical and in line, the walls of covers 47 will remain in line when arm portions 7, 8 swivel about swivel axis 9, as a result of which the appearance of the swivel axis appears to remain unchanged.

Figure 9:
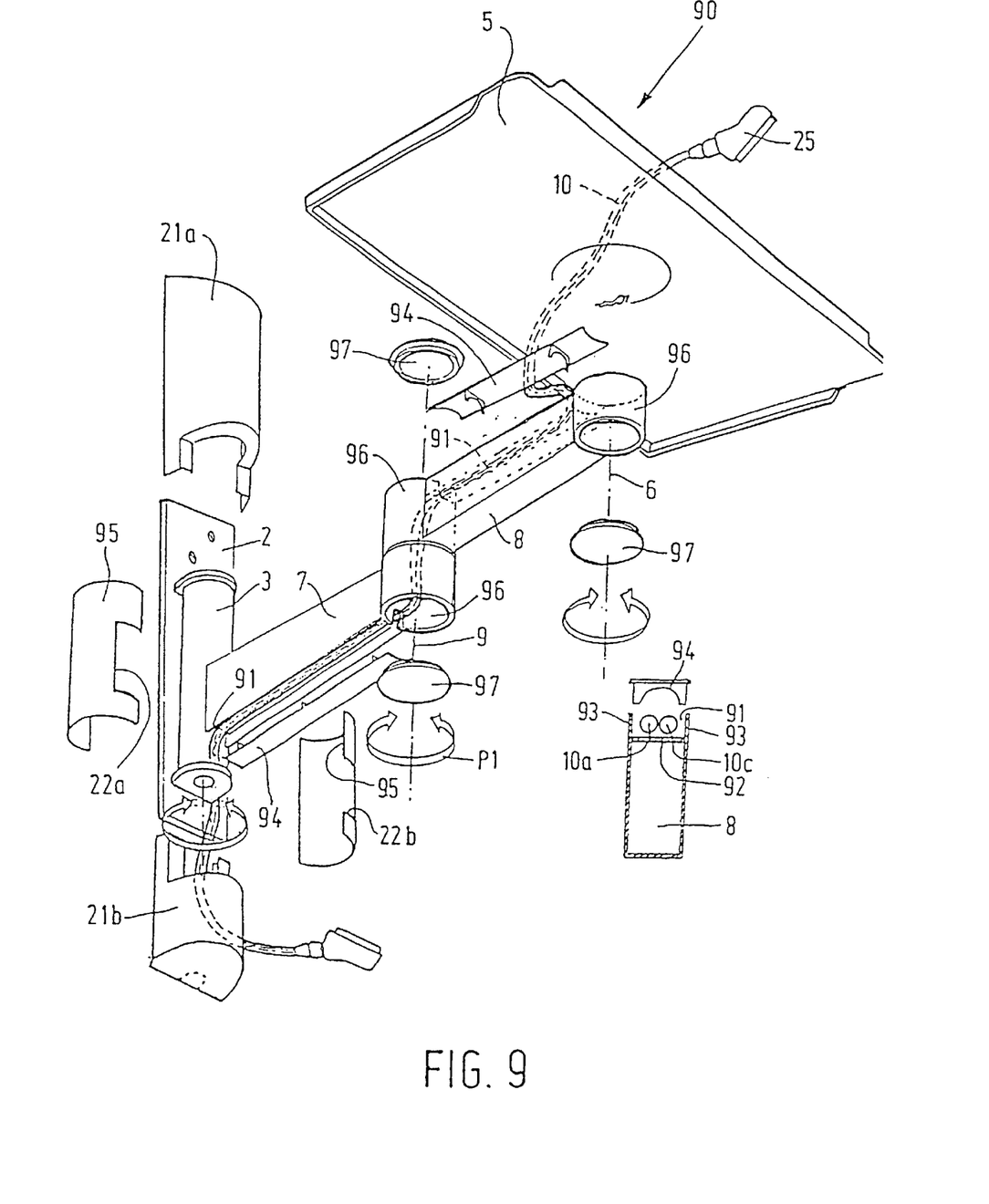
FIG. 9 shows an eighth embodiment of the device according to the invention.

FIG. 9 shows a device 90 according to the invention, wherein arm portions 7, 8 comprise a U-shaped section 91 on their lower side and their upper side respectively. Said U-shaped section 91 is made up of a short side 92 of a tubular section and two extended long sides 93 extending on either side of short side 92. U-shaped section 91 is closed by means of a cover 94, which is in engagement with walls 93 under spring force. Two covers 95 are provided near pivot axis 3, which covers engage round pivot axis 3, bounding a recess 22 formed by notches 22a, 22b. Arm portions 7, 8 are provided with sleeve-shaped ends 96 near swivel axis 9 and pivot axis 6, the internal diameter of said sleeve-shaped ends being selected to allow the plugs attached to cable 10 to pass therethrough. After cable 10 has been provided, the open ends of sleeve-shaped ends 96 can be closed by means of circular covers 97. Cable 10 can also be hidden from view in this manner.

FIGS. 1–9 show devices which are suitable for being fixed to a wall. It is also possible to provide the supporting arm with a vertical arm portion, which makes the device suitable for being fixed to a ceiling. The covers must be shaped accordingly. It is also possible to use only one arm portion or more than two arm portions.

Figure 10:
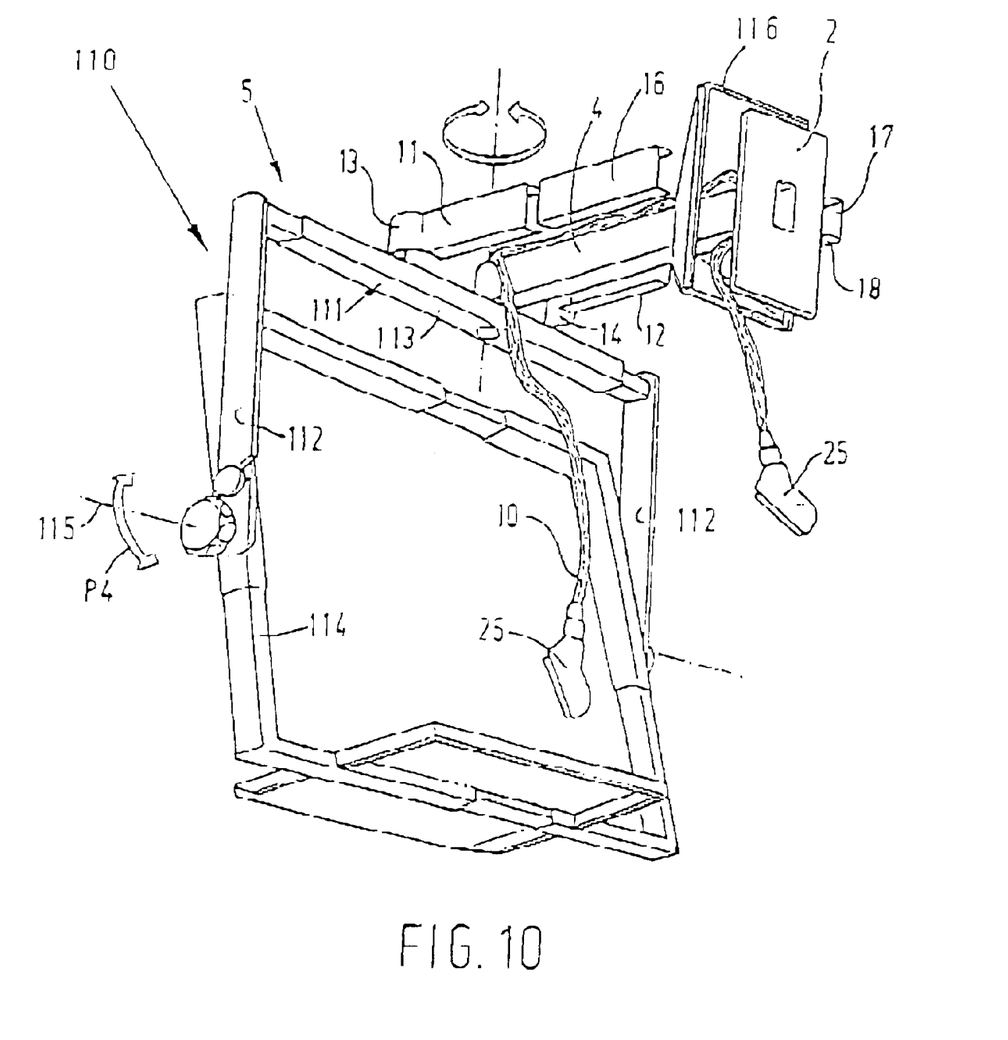
FIG. 10 shows a perspective view of a device according to the invention, wherein the device comprises a frame-shaped platform.

FIG. 10 shows an embodiment of a device 110 according to the invention, which comprises a plate 2, which can be fixed to a wall, and an arm 4 extending transversely thereto. Arm 4 is provided with a frame-shaped supporting platform 5 at an end remote from plate 2. Frame-shaped supporting platform 5 comprises a U-shaped bracket 111, which comprises two vertically extending legs 112 and a bridge portion 113 interconnecting said legs. A rectangular frame 114 is pivoted to U-shaped bracket 111 at the end of legs 112 remote from bridge portion 113. Rectangular frame 114 can pivot about a horizontally extending pivot axis 115 with respect to U-shaped bracket 111, in directions indicated by double arrow P4. A TV set can be placed on rectangular frame 114 in a manner which is known per se. The TV set is connected, inter alia by means of cable 10, whereby cable 10 extends along arm portion 4 and is hidden from view by covers 11, 12, 16, 17, 116.

What is claimed is:

1. A device for supporting an electrical apparatus, wherein the device comprises:

a supporting arm, which is connectable to a wall or a ceiling with a first end, and which is provided with a supporting platform for the electrical apparatus at a second end remote from said first end; whereby, near at least one end, the supporting arm is capable of pivoting movement about at least one pivot axis; wherein said pivot axis extends substantially perpendicularly to said supporting arm; wherein said pivot axis extends substantially parallel to the wall when said supporting arm is connected to the wall; and wherein said pivot axis extends substantially parallel to the ceiling when said supporting arm is connected to the ceiling;

said device furthermore comprising a cover that can be detachably attached to the supporting arm, whereby a cable pass-through space extends between said supporting arm and said cover; wherein said device is provided with at least two opposed covers, each comprising a flange engaging around said pivot axis from different sides of said pivot axis, wherein said pivot axis is substantially parallel to said flanges; and whereby the cable pass-through space extends between said flanges and said pivot axis.

2. A device according to claim 1, wherein in use a cable extends along the supporting arm near the pivot axis, which cable then extends in a first direction parallel to the pivot axis and subsequently in a second direction parallel to said pivot axis, said second direction being opposite said first direction, after which said covers comprising said flanges are provided over parts of the cable extending parallel to the pivot axis.

3. A device according to claim 1, wherein said supporting arm comprises at least two arm portions capable of swivelling movement about a swivel axis with respect to each other, whereby said arm portions lie in one and the same plane, wherein said supporting arm is provided near said swivel axis with a deformable bellows, which extends at least partially over said two arm portions, whereby the cable pass-through space extends through said bellows.

4. A device according to claim 1, wherein said supporting arm comprises at least two arm portions capable of swivelling movement about a swivel axis with respect to each other, wherein said arm portions are positioned one above another near said swivel axis, whereby the first cover is provided with a cup-shaped part that engages around an end of an arm portion comprising part of said swivel axis, and whereby the cable pass-through space, having a shape of a segment of a cylinder, extends between said arm portion and said cup-shaped part.

5. A device according to claim 4, wherein in use a cable is passed around the swivel axis, after which the cover comprising said cup-shaped part is provided over said arm portion.

6. A device according to claim 4, wherein the swivel axis is hollow and forms the cable pass-through space, whereby open ends of the hollow swivel axis can be closed by means of covers.

7. A device according to claim 1, wherein said supporting arm comprises a section which is open to one side, which open side is closed by means of the cover, whereby said cover and the section being open to one side bound the cable pass-through space.

8. A device according to claim 1, wherein said at least two covers engage one another, wherein the two covers enclose said supporting arm, whereby the cable pass-through space extends between said supporting arm and said covers.

9. A device for supporting an electrical apparatus, wherein the device comprises:
   (a) a supporting arm having a first end and a second end remote from the first end; wherein the supporting arm is connectable to a wall or to a ceiling with the first end; wherein the supporting arm at the second end is provided with a supporting platform for the electrical apparatus; wherein, near at least one end of the supporting arm, the supporting arm is capable of pivoting movement about at least one pivot axis; wherein the pivot axis extends substantially perpendicularly to the supporting arm; wherein the pivot axis extends substantially parallel to the wall when the supporting arm is connected to the wall; and wherein the pivot axis extends substantially parallel to the ceiling when the supporting arm is connected to the ceiling; and
   (b) a first cover that can be detachably attached to the supporting arm, wherein a cable pass-through space extends between the supporting arm and the first cover when the first cover is attached to the supporting arm, wherein the first cover comprises at least two second covers, each second cover comprising a flange, wherein said pivot axis is substantially parallel to said flanges, wherein the flanges engage around the pivot axis from different sides, and whereby the cable pass-through space extends between the flanges and the pivot axis.

10. A device as claimed in claim 9, wherein the flanges surround the pivot axis when the at least two second covers are attached to the supporting arm.

11. A device as claimed in claim 10, wherein in use a cable extends along the supporting arm near the pivot axis, wherein a first part of the cable extends in a first direction parallel to the pivot axis, wherein a second part of the cable extends in a second direction parallel to the pivot axis, wherein the second direction is opposite to the first direction, and wherein the at least two second covers cover the first part and the second part of the cable when the second covers are attached to the supporting arm.

12. A device as claimed in claim 9, wherein the supporting arm near the first end is capable of pivoting movement about the pivot axis.

13. A device according to claim 9, wherein the supporting arm comprises at least two arm portions capable of swivelling movement about a swivel axis with respect to each other, wherein the supporting arm is provided near the swivel axis with a bellows that extends at least partially over the two arm portions, whereby the cable-pass through space extends through the bellows.

14. A device as claimed in claim 13, wherein the supporting arm comprises a section that is open to one side, wherein the open side is closed by means of the first cover, wherein the first cover and the section that is open to one side bound the cable pass-through space.

15. A device as claimed in claim 14, wherein the first cover comprises at least two covers engaging one another, wherein the two covers enclose the supporting arm, whereby the cable pass-through space extends between the supporting arm and the two covers.

16. A device as claimed in claim 13, wherein the first cover comprises at least two covers engaging one another, wherein the two covers enclose the supporting arm, whereby the cable pass-through space extends between the supporting arm and the two covers.

17. A device as claimed in claim 9, wherein the supporting arm comprises at least a first arm portion and a second arm portion capable of swivelling movement about a swivel axis with respect to each other, wherein the first arm portion is positioned above the second arm portion near the swivel axis, wherein the swivel axis comprises an end part of the first or second arm portion, wherein the first cover is provided with a cup-shaped part that engages around the end part of the arm portion, wherein the cable pass-through space extends between the end part of the arm portion and the cup-shaped part, and wherein the cable pass-through space that extends between the end part of the arm portion and the cup-shaped part has a shape of a segment of a cylinder.

18. A device as claimed in claim 9, wherein the supporting arm comprises at least a first arm portion and a second arm portion capable of swivelling movement about a swivel axis with respect to each other, wherein the swivel axis comprises a swivel part of the first or second arm portion, wherein the first cover is provided with a cup-shaped part that engages around the swivel part of the arm portion, and wherein the cable pass-through space extends between the swivel part of the arm portion and the cup-shaped part.

19. A device as claimed in claim 9, wherein the electrical apparatus comprises a TV set.

20. A device for supporting an electrical apparatus, wherein the device comprises:
   (a) a supporting arm having a first end and a second end remote from the first end; wherein the supporting arm is connectable to a wall or to a ceiling with the first end; wherein the supporting arm at the second end is provided with a supporting platform for the electrical apparatus; and wherein, near at least one end of the supporting arm, the supporting arm is capable of pivoting movement about at least one pivot axis; and
   (b) a first cover that can be detachably attached to the supporting arm, wherein a cable pass-through space extends between the supporting arm and the first cover when the first cover is attached to the supporting arm; wherein the supporting arm comprises at least two arm portions capable of swivelling movement about a swivel axis with respect to each other; wherein the supporting arm is provided near the swivel axis with a bellows that extends at least partially over the two arm portions, whereby the cable-pass through space extends through the bellows, wherein the first cover comprises at least two covers engaging one another, wherein the two covers enclose the supporting arm, whereby the cable pass-through space extends between the supporting arm and the two covers.

21. A device as claimed in claim 20, wherein the supporting arm comprises a section that is open to one side, wherein the open side is closed by means of the first cover, wherein the first cover and the section that is open to one side bound the cable pass-through space.

22. A device as claimed in claim 20, wherein the electrical apparatus comprises a TV set.

23. A device for supporting an electrical apparatus, wherein the device comprises:
   (a) a supporting arm having a first end and a second end remote from the first end; wherein the supporting arm is connectable to a wall or to a ceiling with the first end; wherein the supporting arm at the second end is provided with a supporting platform for the electrical apparatus; wherein, near at least one end of the supporting arm, the supporting arm is capable of pivoting movement about at least one pivot axis, and wherein said at least one pivot axis is substantially perpendicular to said supporting arm; and (b) a first cover that can be detachably attached to the supporting arm; wherein a cable pass-through space extends between the supporting arm and the first cover when the first cover is attached to the supporting arm; wherein the first cover comprises at least two covers each second cover comprising a flange, wherein the flanges engage one another around said at least one pivot axis from different sides, wherein said at least one pivot axis is substantially parallel to said flanges; wherein the two covers enclose the supporting arm; whereby the cable pass-through space extends between the supporting arm and the two covers.

24. A device as claimed in claim 23, wherein the electrical apparatus comprises a TV set.

25. A device for supporting an electrical apparatus, wherein the device comprises:

a supporting arm, which is connectable to a wall or a ceiling with a first end, and which is provided with a supporting platform for the electrical apparatus at a second end remote from said first end, whereby near at least one end the supporting arm is capable of pivoting movement about at least one pivot axis, said device furthermore comprising a cover that can be detachably attached to the supporting arm, whereby a cable pass-through space extends between said supporting arm and said cover, wherein said device is provided with at least two opposed covers, each comprising a flange engaging around said pivot axis from different sides of said pivot axis, wherein the cable pass-through space extends between said flanges and said pivot axis; and wherein said supporting arm comprises at least two arm portions capable of swivelling movement about a swivel axis with respect to each other, whereby said arm portions lie in one and the same plane, wherein said supporting arm is provided near said swivel axis with a deformable bellows, which extends at least partially over said two arm portions, whereby the cable pass-through space extends through said bellows.

26. A device as claimed in claim 25, wherein said supporting arm comprises a section which is open to one side, which open side is closed by means of the cover, whereby said cover and the section being open to one side bound the cable pass-through space.

27. A device as claimed in claim 26, wherein said at least two covers engage one another, wherein the two covers enclose said supporting arm, whereby the cable pass-through space extends between said supporting arm and said covers.

28. A device as claimed in claim 25, wherein said at least two covers engage one another, wherein the two covers enclose said supporting arm, whereby the cable pass-through space extends between said supporting arm and said covers.

29. A device as claimed in claim 25, wherein the electrical apparatus comprises a TV set.

30. A device for supporting an electrical apparatus, wherein the device comprises:

a supporting arm, which is connectable to a wall or a ceiling with a first end, and which is provided with a supporting platform for the electrical apparatus at a second end remote from said first end, whereby near at least one end the supporting arm is capable of pivoting movement about at least one pivot axis, wherein said at least one pivot axis is substantially perpendicular to said supporting arm, said device furthermore comprising a cover that can be detachably attached to the supporting arm, whereby a cable pass-through space extends between said supporting arm and said cover, wherein said device is provided with at least two opposed covers, each comprising a flange engaging around said pivot axis from different sides of said pivot axis, wherein said pivot axis is substantially parallel to said flanges, whereby the cable pass-through space extends between said flanges and said pivot axis; and wherein said at least two covers engage one another, wherein the two covers enclose said supporting arm, whereby the cable pass-through space extends between said supporting arm and said covers.

31. A device as claimed in claim 30, wherein the electrical apparatus comprises a TV set.

32. A device for supporting an electrical apparatus, wherein the device comprises:

(a) a supporting arm having a first end and a second end remote from the first end; wherein the first end of the supporting arm is connected to a plate; wherein the plate is connectable to a wall or to a ceiling; wherein the supporting arm at the second end is provided with a supporting platform for the electrical apparatus; wherein, near at least one end of the supporting arm, the supporting arm is capable of pivoting movement about at least one pivot axis; wherein the pivot axis extends substantially perpendicularly to the supporting arm; wherein the pivot axis extends substantially parallel to the plate; and (b) a first cover that can be detachably attached to the supporting arm, wherein a cable pass-through space extends between the supporting arm and the first cover when the first cover is attached to the supporting arm, wherein the first cover comprises at least two second covers, each second cover comprising a flange, wherein the flanges engage around the pivot axis from different sides, wherein said pivot axis is substantially parallel to said flanges, and whereby the cable pass-through space extends between the flanges and the pivot axis.

* * * * *